United States Patent [19]

Schippers et al.

[11] 4,364,717
[45] Dec. 21, 1982

[54] EXHAUST GAS TURBOCHARGER

[75] Inventors: Heinz Schippers; Werner Branscheid; Erich Lenk; Udo Hardt, all of Remscheid, Fed. Rep. of Germany

[73] Assignee: Barmag Barmer Maschinenfabrik AG, Remscheid, Fed. Rep. of Germany

[21] Appl. No.: 54,411

[22] Filed: Jul. 3, 1979

[30] Foreign Application Priority Data

Jul. 3, 1978 [DE] Fed. Rep. of Germany ....... 2829150

[51] Int. Cl.³ .................... F01D 25/12; F01D 25/18
[52] U.S. Cl. .................................... 417/407; 60/606; 415/180
[58] Field of Search ............... 415/178, 180, 170 R, 415/175; 417/407; 60/606

[56] References Cited

U.S. PATENT DOCUMENTS

| | | | |
|---|---|---|---|
| 1,953,540 | 4/1934 | Ogden | 415/175 |
| 2,173,489 | 9/1939 | Voigt | 415/180 X |
| 2,442,579 | 6/1948 | Auger | 415/180 X |
| 2,474,615 | 6/1949 | Busquet | 415/180 X |
| 2,646,210 | 7/1953 | Kohlmann | 417/407 |
| 2,918,207 | 12/1959 | Moore | 417/407 X |
| 2,938,659 | 5/1960 | Judson | 417/407 |
| 3,004,806 | 10/1961 | Schinnerer | 417/407 |
| 3,094,271 | 6/1963 | Greenwald | 417/407 |
| 3,411,706 | 11/1968 | Woolenweber | 417/407 |
| 4,018,053 | 4/1977 | Rudert et al. | 60/606 |
| 4,101,241 | 7/1978 | Kasuya | 417/407 |
| 4,157,881 | 6/1979 | Kasuya | 417/407 |

FOREIGN PATENT DOCUMENTS

| | | | |
|---|---|---|---|
| 1012365 | 4/1952 | France | 60/606 |
| 421110 | 12/1934 | United Kingdom | 60/606 |
| 504263 | 4/1939 | United Kingdom | 60/606 |
| 941532 | 11/1963 | United Kingdom | 60/606 |

*Primary Examiner*—Michael Koczo
*Attorney, Agent, or Firm*—Bell, Seltzer, Park & Gibson

[57] ABSTRACT

An apparatus for turbocharging an internal combustion engine, and which is characterized by the ability to avoid excessive heat transfer to the bearings and any other heat sensitive components. In the preferred embodiment, the lubricating oil for the bearings in the turbocharger housing is directed through a passageway in the bearing shaft and is discharged onto the end wall of the bearing housing in a circular pattern, to thereby cool the end wall and minimize heat transfer from the turbine to the bearings in the housing. Also, the end wall of the bearing housing is spaced from the adjacent rear wall of the turbine housing to define a cooling air gap therebetween, and apertures are provided in the housing for permitting air to flow through the cooling gap to cool the opposing surfaces of the two adjacent walls and thereby minimize heat transfer therebetween. Still further, the turbocharger of the present invention may include an air duct for conveying a portion of the compressed air into the turbine housing, to thereby lower the temperature of the exhaust gases and thus also the temperature of the turbine.

18 Claims, 3 Drawing Figures

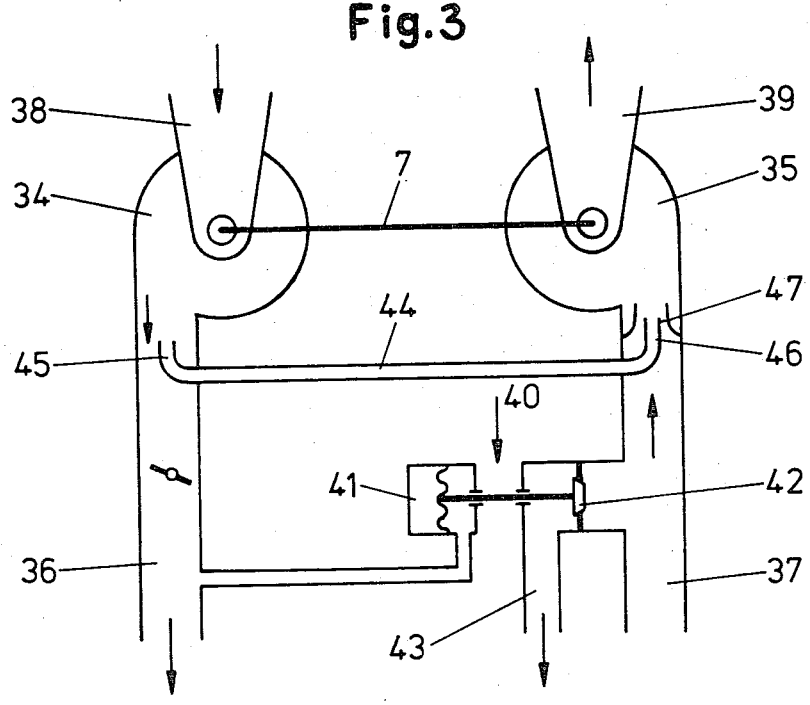
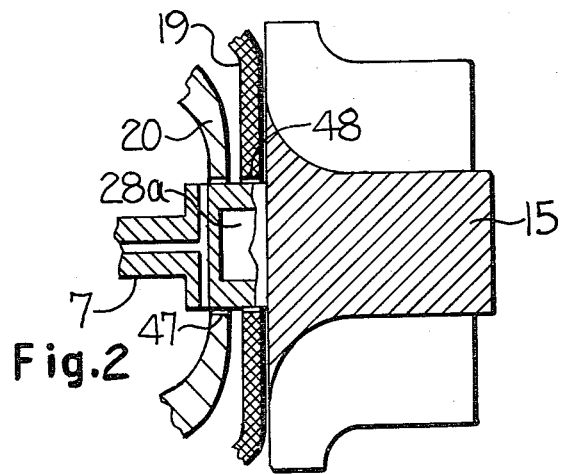

EXHAUST GAS TURBOCHARGER

Exhaust gas turbochargers are commonly employed in association with internal combustion engines, such as Diesel or Otto-cycle gasoline engines, for increasing the available horsepower thereof. Generally, such turbochargers comprise a turbine and centrifugal or rotary compressor mounted on a common shaft. The exhaust gases of the engine are utilized to rotate the turbine wheel, and thus the compressor wheel, and the rotary compressor acts to pressurize the air being delivered to the engine's combustion chambers.

The rotational speed of such exhaust gas turbochargers often exceeds 100,000 revolutions per minute, and for this reason, an oil lubricated bearing system is preferably used for mounting the common shaft for the exhaust gas turbine wheel and rotary compressor wheel. Temperatures of about 800 degrees C. occur in the exhaust gas turbine in the case of Diesel engines and above about 1,000 degrees C. in the case of Otto-cycle engines. The resulting heat flow from the turbine wheel and the housing to the adjacent bearing housing poses a significant problem, in that excessive temperatures can result in the destruction of the bearings, as well as in the decomposition of the lubricating oil.

It is accordingly an object of the present invention to provide means for rotatably mounting an exhaust gas turbine or the like, and which avoids the overheating of heat sensitive components thereof.

It is a more specific object of the present invention to provide a turbocharging apparatus of the described type which has provision for reducing heat transfer from the exhaust gas turbine wheel into the bearing housing, to thereby avoid damage to the bearings and oil of the lubrication system.

These and other objects and advantages of the present invention are achieved in accordance with the present invention by the provision of an apparatus which comprises a bearing housing having an end wall with an opening therethrough, a shaft having a turbine wheel mounted thereon and including an internal passageway which defines an inlet and a radially directed outlet, means rotatably mounting the shaft in the bearing housing, and means for conducting lubricating oil to the inlet of the shaft passageway during rotation of the shaft and so that the oil exits radially from the passageway outlet and contacts the surface of the end wall of the bearing housing in a circular pattern to thereby cool the same. Preferably, the means mounting the shaft in the bearing housing includes a pair of oil lubricated rotary bearings mounted in axially spaced relation on the shaft, and the inlet of the shaft passageway is disposed intermediate the rotary bearings, so that the lubricating oil flows through the bearings and then into the inlet of the passageway on the shaft.

As another specific aspect of the present invention, there is provided a turbocharging apparatus wherein the bearing housing has an end wall which is spaced from the adjacent rear wall of the turbine housing to define an annular cooling gap therebetween, and apertures are provided in the housing for permitting air to flow through the cooling gap to cool the opposing surfaces of the end wall and rear wall and thereby minimize heat transfer therebetween. Preferably, the apertures to the cooling gap are positioned to permit ambient air to move through the cooling gap by natural convection during operation of the apparatus. Further, the end wall of the bearing housing and/or the rear wall of the turbine housing may be coated with or formed from a suitable heat-insulating material, to further thermally insulate the bearings from the high temperatures of the turbine wheel. Also, the end of the shaft to which the turbine wheel is affixed may have a coaxial passage which serves to minimize the thermal bridge, and in one embodiment of the present invention, this passage is evacuated to provide thermally insulating space.

As still another aspect of the present invention, the turbocharger may include an air duct for conveying a portion of the air compressed in the compressor housing into the turbine housing, to thereby lower the temperature of the exhaust gases and cool the turbine wheel during operation of the apparatus.

Some of the objects having been stated, other objects will appear as the description proceeds, when taken in connection with the accompanying drawings in which:

FIG. 2 is a fragmentary sectional view illustrating an alternative embodiment of the bearing shaft utilized in the present invention;

FIG. 3 is a schematic illustration of an exhaust gas turbocharger having a cooling air system in accordance with the present invention.

Figure 1:
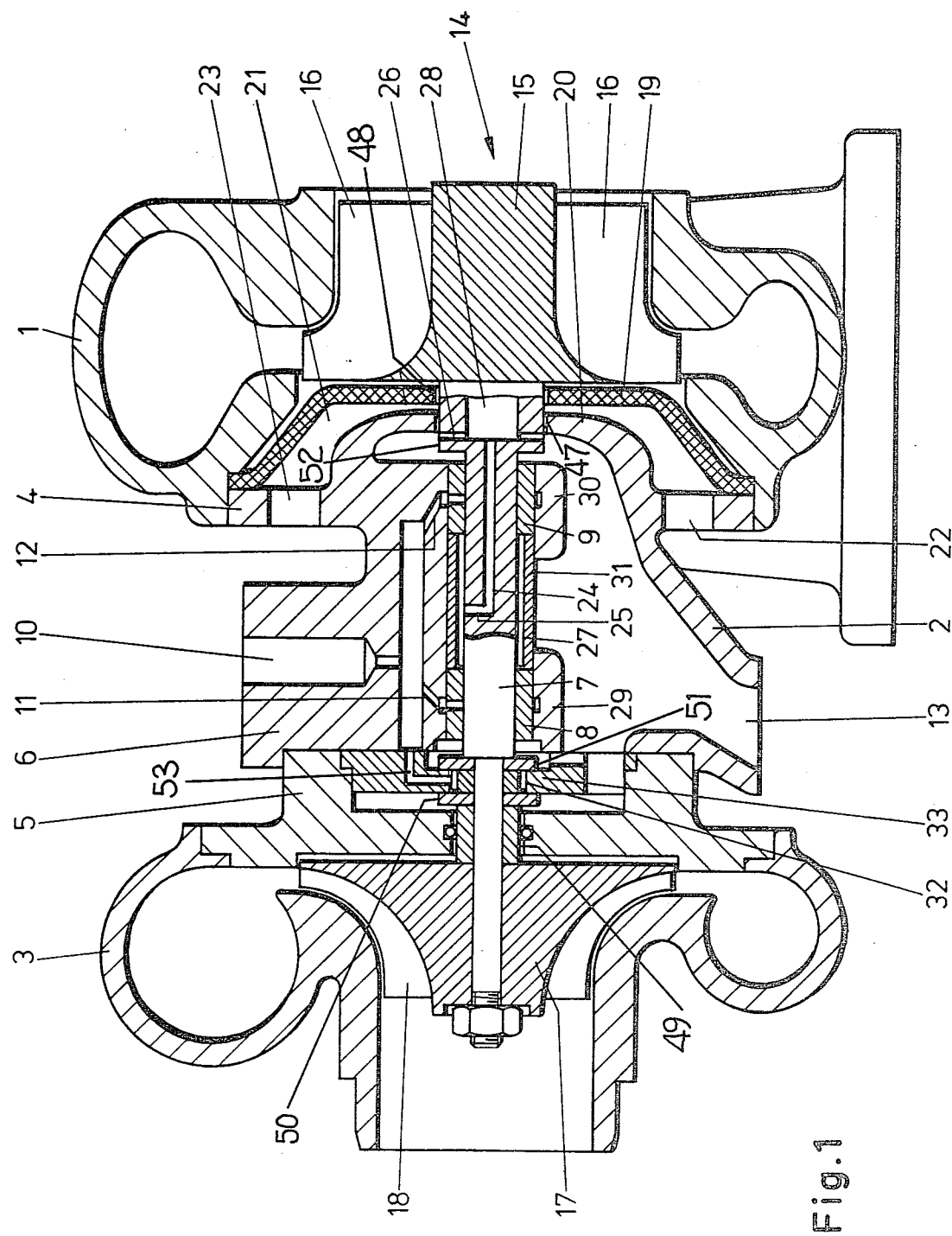
FIG. 1 is a horizontal sectional view of an exhaust gas turbocharger embodying the features of the present invention.

Referring now specifically to the drawings, there is disclosed in FIG. 1 an exhaust gas turbocharger which embodies the features of the present invention, and which is composed of a turbine housing 1, a bearing housing 2, and a compressor housing 3. The bearing housing 2 includes an end wall at one end thereof, which is composed of the radial flange 4 and end wall portion 20. Also, the end wall includes a centrally disposed circular opening 47 therethrough. The bearing housing 2 further includes a pair of spaced apart integral bushes 29 and 30, which define circular openings which are axially aligned with the opening 47 in the end wall.

The turbine housing 1 is mounted on the flange 4 of the bearing housing, and includes a rear wall 19 which also has an opening 48 therethrough. The compressor housing 3 includes a wall section 5 which is fixed to the bearing housing 2 in the recess 6, and the wall section 5 includes an opening 49 therethrough which is coaxially aligned with the bushes 29, 30 and opening 47.

The turbocharger further comprises a bearing shaft 7 rotatably mounted in the bearing housing, and having one end extending through the opening 47 of the end wall and the opening 48 of the rear wall. Preferably, the shaft 7 is sealed in the opening 47 by conventional means (not shown) to prevent the passage of a liquid and for the purposes to become apparent. An exhaust gas turbine wheel 14 comprising a hub 15 and blades 16 is affixed to this end of the shaft, as by welding, and is operatively disposed in the turbine housing 1. The other end of the shaft extends through the opening 49 in the wall section 5, and mounts a rotary compressor wheel 17 having blades 18 in the compressor housing 3. The shaft 7 is rotatably mounted in the bushes 29 and 30 by a pair of oil lubricated sleeve bearings 8, 9 and a sleeve 31 is coaxially disposed about the shaft in radially spaced relation, and extends between the bearings to define an annular chamber 27 therebetween.

A thrust bearing is mounted on the end of the shaft 7 within the bearing housing, and comprises spaced rings 50, 51 of relatively large diameter, and an intermediate sleeve (not numbered) of smaller diameter. An axial bearing holding disc 33 is fixed between the bearing housing 2 and wall section 5 of the compressor housing, and the disc 33 extends within the groove defined between the spaced rings 50, 51, and is spaced from the intermediate sleeve to form an annular gap 32. The rings 50, 51 and disc 33 are axially dimensioned so that lubricating oil may be forced between the opposing surfaces to form a lubricating film in the manner hereinafter further described. To complete the mounting of the shaft 7 in the turbocharger, there is provided a conventional sealing ring within the opening 49 of the wall section 5 for sealing the shaft 7 and to prevent losses from the lubricating system into the housing of the rotary compressor 17.

As best seen in FIG. 1, the shaft 7 has an enlarged diameter portion 52 at the end to which the hub 15 of the turbine wheel 14 is affixed, and the shaft further includes an internal passageway which defines a radially directed inlet 25 at a medial point along its length, a radially directed outlet 26 adjacent the end to which the hub 15 of the turbine wheel 14 is affixed, and an axial segment 24 interconnecting the inlet and outlet. The inlet 25 is disposed intermediate the bearings 8, 9 and communicates with the annular chamber 27, and the outlet 26 is disposed adjacent the inside of the end wall portion 20 of the bearing housing. The outlet 26 is also disposed on the enlarged diameter portion 52 of the shaft, and thus it terminates at a point radially beyond the inlet 25 of the passageway. Also, the enlarged diameter portion 52 of the shaft is hollow to define an enclosed chamber 28, which communicates with the passageways of the shaft. In the embodiment of FIG. 2 however, the chamber 28a terminates short before the passageway in the shaft, and it is sealed and evacuated, to thereby provide a thermally insulating space. In this regard, the evacuation of the chamber 28a may for example be accomplished by the electron beam welding of the shaft to the turbine wheel 14 under vacuum conditions and so as to form an encircling, sealing seam. In either embodiment, it will be seen that the chamber 28 (or 28a), together with the axial segment 24 of the passageway, serve to minimize the thermal bridge, and thus the thermal conduction, from the turbine wheel 14 to bearings 8, 9.

The turbocharger of the present invention further comprises duct means for conducting pressurized lubricating oil from the lubrication system of the associated internal combustion engine, to the rotary bearings 8, 9, and then into and through the passageway in the shaft 7. By this arrangement, the oil is caused to exit radially from the outlet 26 and so as to contact the inside surface of the end wall in a circular pattern to thereby cool the same. The oil then flows by gravity over the inside surface of the end wall and downwardly through the opening 13 of the housing to the oil sump of the internal combustion engine. The circular pattern of the sprayed oil assures that the cooling oil will wet substantially the full surface area of the wall portion 20 (which is immediately adjacent the hot turbine wheel) with a continuous stream of oil to thereby maximize the cooling effect. Also, in the embodiment of FIG. 1, the fact that the passageway communicates with the chamber 28 permits this oil to contact a significant area of the warmest portion of the shaft, to thereby facilitate the cooling thereof.

As illustrated herein, the above described duct means comprises an oil inlet passage 10 in the bearing housing 2 which communicates via an axial passage (not numbered) to the individual passages 11, 12 which lead to the bearings 8, 9 respectively. The oil issues from both sides of the bearings 8, 9, with a portion entering the annular chamber 27 and the remainder flowing out through the opening 13. The oil which enters the chamber 27 is drawn through the passageway of the shaft, in part by the siphoning or centrifugal pump effect resulting from the fact that the outlet 26 is disposed radially further from the axis of the shaft than is the inlet 25. The oil duct means also includes a passage 53 in the disc 33 for conveying the pressurized oil directly to the gap 32 of the thrust bearing. The oil issuing from the thrust bearing also exits through the outlet opening 13.

As a further aspect of the present invention, the end wall of the bearing housing 2 is opposed to and spaced from the turbine housing rear wall 19 over substantially its full area to define an annular cooling gap 21 therebetween. In addition, a plurality of apertures 22, 23 are provided in the flange 4 of the bearing housing end wall, with the aperture 22 being disposed at the bottom of the cooling gap and the aperture 23 being disposed at the top thereof. By this positioning of the apertures 22, 23, ambient air is permitted to move through the cooling gap by natural or free convection during operation of the apparatus. Thus the gap 21 not only functions as an insulating space, but it also serves to actively cool the walls by reason of the air moving therethrough.

It will also be noted that the rear wall 19 of the turbine housing includes a frusto-conical peripheral portion which is inclined at an angle of about 45 degrees with respect to the axis of the shaft 7, and which extends in a direction toward the bearing housing, to thereby facilitate the transfer of heat from the rear wall 19 to the air passing through the cooling gap 21. The rear wall 19 of the turbine housing, and/or the end wall of the bearing housing, may be coated with or formed from a suitable conventional insulating material, to further thermally insulate the internal components of the bearing housing from the heat of the turbine wheel and turbine housing.

FIG. 3 illustrates another aspect of the present invention, and wherein means are provided for conveying a portion of the air compressed in the compressor housing into the turbine housing, to thereby lower the temperature of the exhaust gases and cool the turbine during operation of the apparatus. As illustrated, there is provided a compressor housing 34 and an exhaust gas turbine housing 35, together with a shaft 7 which interconnects the compressor and turbine in the manner described above. The compressor housing 34 has an air inlet 38 and an air outlet 36 which leads to the combustion chambers of the engine. The turbine housing 35 has an exhaust gas inlet 37 coming from the engine, as well as an outlet 39 leading to the exhaust. Also, there is provided a by-pass line 43 by which a portion of the exhaust gases may be caused to by-pass the turbocharger, and a control device 40 is provided for selectively opening and closing the line 43. More particularly, the outlet 36 of the compressor housing communicates with a pressure gauge 41 by means of which a by-pass valve 42 in the line 43 is opened or controlled. By this arrangement, the by-pass line 43 is progressively opened as the speed of the turbocharger increases. This pressure control device 40 is known in the prior art, and is not per se a part of the present invention.

The turbocharger illustrated in FIG. 3 further comprises a cooling air duct 44 having an inlet end 45 disposed in the outlet 36 of the compressor housing, and an outlet end 46 disposed in the exhaust gas inlet 37 of the turbine housing. Since the static pressure on the outlet side of the compressor is usually approximately equal to or less than the static pressure at the inlet side of the exhaust gas turbine, means are provided for insuring that cooling air will flow through the duct 44 under all operating conditions. In particular, the inlet end 45 of the duct 44 is directed toward the air flowing outwardly through the compressor housing outlet, and so that the resulting dynamic pressure tends to convey the air through the duct. Also, the exhaust gas inlet of the turbine housing includes a restricted passage or Venturi forming a reduced pressure zone 47, and the outlet end 46 of the duct is disposed in alignment with the movement of the exhaust gas and in the reduced pressure zone. As will be apparent, the reduced pressure around the outlet 46 serves to draw the air from the compressor through the duct 44.

In the drawings and specification, there has been set forth a preferred embodiment of the invention, and although specific terms are employed, they are used in a generic and descriptive sense only and not for purposes of limitation.

That which is claimed is:

1. An apparatus for turbocharging an internal combustion engine, and characterized by the ability to avoid excessive heat transfer to heat sensitive components thereof, said apparatus comprising an exhaust gas turbine comprising a turbine housing and a turbine wheel, a rotary compressor comprising a compressor housing and a compressor wheel, a shaft mounting said turbine wheel at one end thereof and said rotary compressor wheel at the other end thereof, a bearing housing having an end wall with an opening therethrough, bearing means rotatably mounting said shaft in said bearing housing so that said shaft extends through said opening of said end wall, and with said turbine wheel being disposed on the outside of said end wall, said turbine housing having a rear wall with an opening therethrough, means mounting said turbine housing to said bearing housing so that said turbine housing operatively encloses said turbine wheel, and with said shaft extending through said opening of said turbine housing rear wall and with said bearing housing end wall being opposed to and spaced from said turbine housing rear wall to define an annular cooling gap therebetween, and including aperture means permitting ambient air to flow through said cooling gap by natural convection during operation of the apparatus to cool the opposing surfaces of said end wall and said rear wall and thereby minimize heat transfer therebetween, and means for directing a continuous stream of oil onto the surface of said bearing housing end wall to thereby cool the same.

2. The apparatus as defined in claim 1 wherein said means mounting said turbine housing to said bearing housing comprises a radial mounting flange on one of said bearing housing and turbine housing, a receptacle on the other of said bearing housing and turbine housing and secured to said flange, and said aperture means comprises a plurality of apertures extending through said flange.

3. The apparatus as defined in claim 1 wherein said turbine housing rear wall includes a frusto conical peripheral portion which is inclined at an angle of about 45 degrees with respect to the axis of said shaft and extends in a direction toward said bearing housing, to thereby facilitate the transfer of heat from said rear wall to the air passing through said cooling gap.

4. The apparatus as defined in claim 1 wherein said means for directing a continuous stream of oil onto said end wall comprises an internal passageway in said shaft which defines an inlet and a radially directed outlet, with said outlet being disposed immediately adjacent the inside of said end wall, and duct means for conducting oil to said inlet of said passageway during rotation of said shaft, and whereby the oil exits radially from said outlet and contacts the inside surface of said end wall in a circular pattern.

5. The apparatus as defined in claim 4 wherein said compressor housing operatively encloses said rotary compressor wheel and is fixed to said bearing housing, and means operatively interconnected between said compressor housing and said turbine housing for conveying a portion of the air compressed in said compressor housing into said turbine housing, to thereby lower the temperature of the exhaust gases and cool said turbine wheel during operation of the apparatus.

6. The apparatus as defined in claim 1 wherein a portion of said shaft at the end to which said turbine wheel is fixed is hollow to define an enclosed chamber, to thereby minimize heat transfer along the length thereof.

7. The apparatus as defined in claim 6 wherein said enclosed chamber is substantially evacuated of air to further minimize heat transfer along the length of said shaft.

8. The apparatus as defined in claim 1 wherein at least one of said end wall and rear wall comprises a material having relatively high thermal insulating properties.

9. An apparatus for rotatably mounting an exhaust gas turbine or the like, and characterized by the ability to avoid the overheating of heat sensitive components thereof, and comprising a bearing housing having an end wall with an opening therethrough, a shaft having a turbine wheel mounted thereon, said shaft including an internal passageway which defines an inlet and a radially directed outlet, bearing means rotatably mounting said shaft in said bearing housing so that said shaft extends through said opening of said end wall, and with said turbine wheel disposed on the outside of said end wall and said passageway outlet disposed adjacent and sufficiently close to said end wall such that oil supplied to said passageway inlet during rotation of the shaft moves through the passageway and exits radially from said outlet and contacts the surface of said end wall in a circular pattern to thereby cool the same, and duct means for conducting lubricating oil to said bearing means and from said bearing means to said passageway inlet of said shaft during rotation of said shaft.

10. The apparatus as defined in claim 9 wherein said bearing means comprises a pair of bearings mounted in axially spaced relation on said shaft, and wherein said passageway inlet of said shaft is disposed intermediate said bearings.

11. The apparatus as defined in claim 10 wherein said passageway outlet is disposed immediately adjacent the side of said end wall opposite said turbine wheel.

12. The apparatus as defined in claim 11 wherein said passageway outlet extends radially further from the axis of said shaft than said passageway inlet, whereby the rotation of the shaft causes the supplied oil to be moved through said passageway by the resulting siphoning effect.

13. An apparatus for turbocharging an internal combustion engine, and characterized by the ability to avoid the overheating of heat sensitive components thereof, and comprising an exhaust gas turbine comprising a turbine housing and a turbine wheel, a rotary compressor comprising a compressor housing and a compressor wheel, a shaft mounting said turbine wheel at one end thereof and said rotary compressor wheel at the other end thereof, said shaft including an internal passageway which defines an inlet and a radially directed outlet adjacent said one end, a bearing housing having an end wall with an opening therethrough, bearing means rotatably mounting said shaft in said bearing housing so that said shaft extends through said opening of said end wall, and with said turbine wheel disposed adjacent the outside of said end wall and said passageway outlet disposed adjacent and sufficiently close to the inside of said end wall such that oil supplied to said passageway during rotation of the shaft moves through the passageway and exits radially from said outlet and contacts the inside surface of said end wall in a circular pattern to thereby cool the same, said bearing means including a pair of rotary bearings mounted in axially spaced relation on said shaft, with said inlet of said shaft passageway disposed intermediate said rotary bearings, and duct means for conducting oil to said inlet of said shaft passageway during rotation of said shaft, said duct means including passage means within said bearing housing for conducting pressurized oil to said bearings and for conducting oil from said bearings to said inlet.

14. The apparatus as defined in claim 13 wherein said passage means for conducting oil from said rotary bearings to said inlet comprises a sleeve disposed coaxially about said shaft in radially spaced relation, and extending between said bearings.

15. The apparatus as defined in claim 13 wherein bearing means further comprises an oil lubricated thrust bearing operatively disposed between said shaft and bearing housing, and wherein said duct means further comprises means for conducting pressurized oil to said thrust bearing.

16. The apparatus as defined in claim 13 wherein said shaft includes an enlarged diameter portion at said one end, and said outlet of said shaft passageway is disposed on said enlarged diameter portion, whereby said outlet terminates at a point radially beyond said inlet of said passageway, and the rotation of said shaft causes oil to flow through said passageway by the resulting siphoning effect.

17. The apparatus as defined in claim 16 wherein said enlarged diameter portion of said shaft is hollow to define an enclosed chamber, and wherein said enclosed chamber communicates with said passageway, whereby oil enters the enclosed chamber from the passageway to facilitate cooling at said shaft one end.

18. The apparatus as defined in any one of claims 9, 10, 11, 12, 13, 14, 15, 16 or 17, wherein said inlet of said internal passageway extends in a radial direction.

* * * * *